F. W. KREMER.
EMERGENCY TIRE.
APPLICATION FILED AUG. 5, 1910.
1,057,746.
Patented Apr. 1, 1913.
2 SHEETS—SHEET 1.
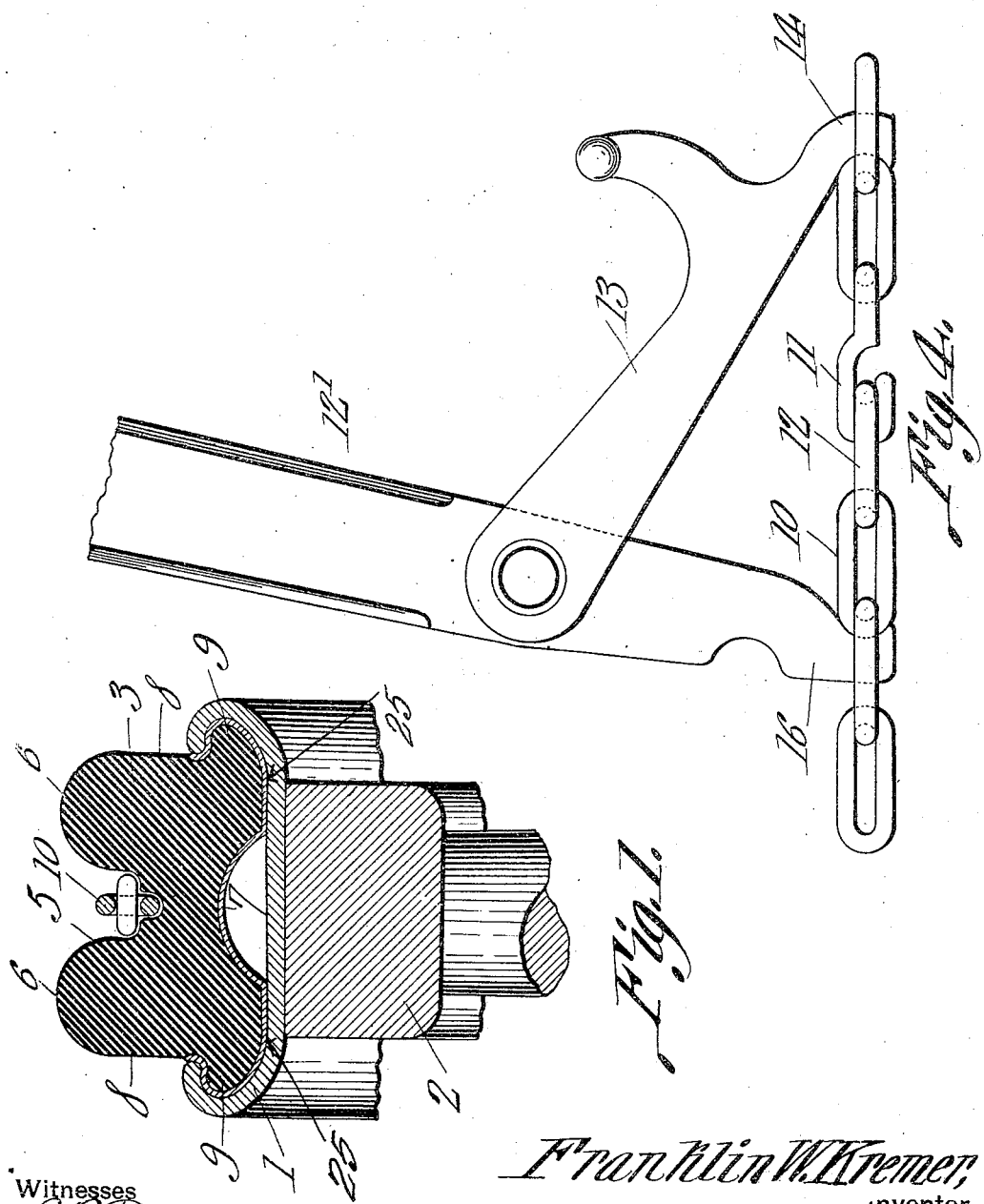

F. W. KREMER.
EMERGENCY TIRE.
APPLICATION FILED AUG. 5, 1910.
1,057,746.
Patented Apr. 1, 1913.
2 SHEETS—SHEET 2.
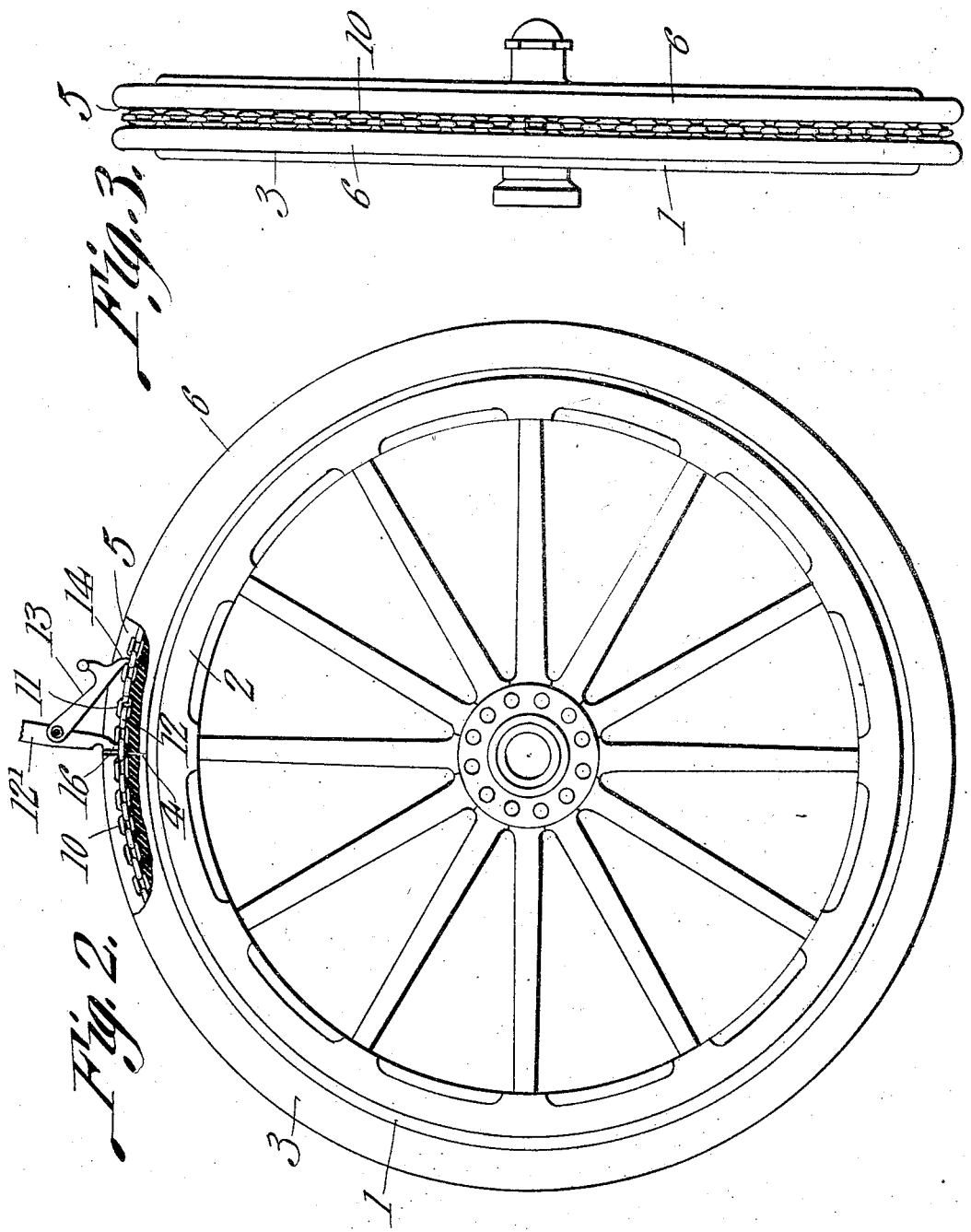
Witnesses
Franklin W. Kremer,
Inventor
by
Attorneys

UNITED STATES PATENT OFFICE.

FRANKLIN WILLIAM KREMER, OF CARLSTADT, NEW JERSEY.

EMERGENCY-TIRE.

1,057,746.  Specification of Letters Patent.  Patented Apr. 1, 1913.

Application filed August 5, 1910. Serial No. 575,754.

*To all whom it may concern:*

Be it known that I, FRANKLIN W. KREMER, a citizen of the United States, residing at Carlstadt, in the county of Bergen and State of New Jersey, have invented a new and useful Emergency-Tire, of which the following is a specification.

This invention relates to a new and useful tire which is particularly adapted for use as an emergency tire on automobiles, although the same form of tire is adapted for permanent use on auto cabs and the like.

The object of the invention is to provide a strong, simple, durable and comparatively inexpensive tire, which can be easily and quickly secured in position on a wheel from which a punctured tire has been removed and which will serve to support the automobile and to prevent injury to the wheel rim while the car is being conducted to a point at which a new tire can be procured and applied.

A further object of the invention is to provide improved and effective means for securing the tire in position.

With the foregoing and other objects in view which will appear as the description proceeds, the invention resides in the combination and arrangement of parts and in the details of construction hereinafter described and claimed, it being understood that changes in the precise embodiment of invention herein disclosed can be made within the scope of the claim without departing from the spirit of the invention.

In the accompanying drawings forming part of this specification:—Figure 1 is a cross section through an emergency tire constructed in accordance with the invention, showing the chain groove on the outside and the air chamber on the inside thereof. Fig. 2 is a side elevation, broken away to show the chain. Fig. 3 is an edge elevation. Fig. 4 is an enlarged detail view showing a convenient method of tightening the chain by means of which the emergency tire is secured in position.

The reference numeral 1 indicates a clencher rim mounted upon the felly 2.

The reference numeral 3 indicates a girdle tire which is formed in a single strip adapted to be bent into circular form and to have its ends fitted together as indicated at 4 in Fig. 2. The girdle tire 3 is formed in the outer face thereof with a chain groove 5 which serves to separate the tread portions thereof into a pair of tread ribs 6—6. On its inner face the tire 3 preferably is grooved as indicated at 7 to form an air chamber. The inner portions of the side edges 8 of the tire are extended outward to form beads as indicated at 9 so as to provide means for engaging the clencher rim 1 to hold the emergency tire in position.

A useful but not obligatory means for securing the emergency tire in position upon the clencher rim 1 is shown and consists of a chain or cable 10 which extends longitudinally of the groove 5, and has the ends thereof suitably joined together. For the purpose of facilitating the application of the chain 10 to the tire, one end of said chain is provided with a hook member 11 which is adapted to engage the link 12 at the other end of the chain. Any suitable chain tightening means is employed for applying the chain. For the sake of illustration, a chain tightener has been illustrated in Fig. 4 as consisting of a lever 12' having a link 13 connected therewith and formed with a hook member 14 to engage one end of the chain, the lower end of the lever 12' being provided with a hook member 16 to engage the other end of the chain. By manipulating the lever 12' the chain can be tightened in the groove 5 and the hook member 11 engaged with the link 12 to secure the chain in position.

It is to be understood that the emergency tire is normally rolled in the form of a very small coil so that it can be stored away in the tool box of the motor car if desired. In the event that a tire becomes punctured beyond the possibility of immediate repair, and that the car is not equipped with an extra tire casing, the punctured tire is entirely removed from the clencher rim and the emergency tire is unwrapped and flexed along its longitudinal center, that is along the thin portion between the groove 5 and the groove 7 whereby to facilitate the insertion of the beads 9 into the side portions of the clencher rim 1. After the tire has been inserted in the manner described, the central portion is flattened down. The chain 10 may be inserted in the groove 5 and tightened up in the manner indicated. The tightening action of the chain serves to spread the rim members 9 tightly into the clencher rim, and thus confine a certain amount of air in the air chamber 7.

It is found in practice that the emergency tire described effectually serves to convey the car to a point at which a new pneumatic tire can be secured.

The chain 10 may be dispensed with entirely, and the tire herein disclosed will remain interlocked with the rim when the chain is not employed. When a weight is superimposed upon the tire, the weight will be carried through the ribs 6 into two flat bearing areas 25 located upon opposite sides of the groove 7 and between the groove 7 and the clencher beads 9. These flat bearing areas are located in a common plane, and are positioned directly beneath the ribs 6. The tire, when a weight is superposed thereon, will flatten transversely, the tire yielding between the grooves 5 and 7, and the clencher beads 9 being forced laterally. Owing to the fact that the flat bearing areas 25 are located in a common plane and are disposed at right angles to the median plane of the tire, the tire when pressed upon the ground, will move laterally in opposite directions, away from the median plane of the tire, causing an engagement between the clencher beads 9 and the clencher rim. No matter how great a weight is imposed upon the tire, there will be no tendency for the clencher beads 9 to be retracted toward the median plane of the tire. The groove 7 and the groove 5 are alined, thereby thinning the tire along its median plane, so that the tire may expand laterally in the manner hereinbefore set forth. Owing to the construction last above referred to, the tire may be folded readily along its median plane, to facilitate the insertion of the clencher beads 9 into the clencher rim.

What is claimed is:—

A tire having clencher beads and provided in its outer face with a groove defining spaced tread ribs, and also provided in its under face with another groove alined with the first specified groove, the under face of the tire being provided with flat bearing areas located between the second specified groove and the beads, the bearing areas being located directly beneath the ribs and being disposed in a common plane at right angles to the median plane of the tire.

In testimony that I claim the foregoing as my own, I have hereto affixed my signature in the presence of two witnesses.

FRANKLIN WILLIAM KREMER.

Witnesses:
    FRANK DE WITT,
    FRANK WORSNOPP.